K. E. PEILER.
METHOD AND MACHINE FOR GATHERING GLASS.
APPLICATION FILED DEC. 4, 1916.

1,324,464.                                    Patented Dec. 9, 1919.

Witness:
S. S. Grotta

Inventor:
Karl E. Peiler
by Wm H Honiss
Att'y.

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

METHOD AND MACHINE FOR GATHERING GLASS.

1,324,464.          Specification of Letters Patent.        Patented Dec. 9, 1919.

Application filed December 4, 1916. Serial No. 134,827.

*To all whom it may concern:*

Be it known that I, KARL E. PEILER, a citizen of the United States, residing at Hartford, in the county of Hartford and State of Connecticut, have invented new and useful Improvements in Methods and Machines for Gathering Glass, of which the following is a specification.

This invention relates to the art of gathering molten glass from a furnace or other container, and discharging it in specified uniform quantities for subsequent shaping.

The object of the invention is to provide an improved method and apparatus for feeding molten glass from the tank or pot of a glass melting furnace in gathers of uniform size, consistency and temperature and deliver mold charges therefrom without unduly chilling them.

To this end a gathering head is thrust into the fluid glass in the melting furnace and rotated so as to gather a mass of glass simulating thus far the well known art of gathering by hand, and is then withdrawn from the furnace to an auxiliary hot chamber wherein the glass accumulated on the head is allowed to slump or shed down from the head, in the heat of the chamber, so that the desired quantity for a mold charge can be separated by gravity aided by shears when necessary and discharged while it remains in the most suitable condition for further manipulation.

Figure 2:
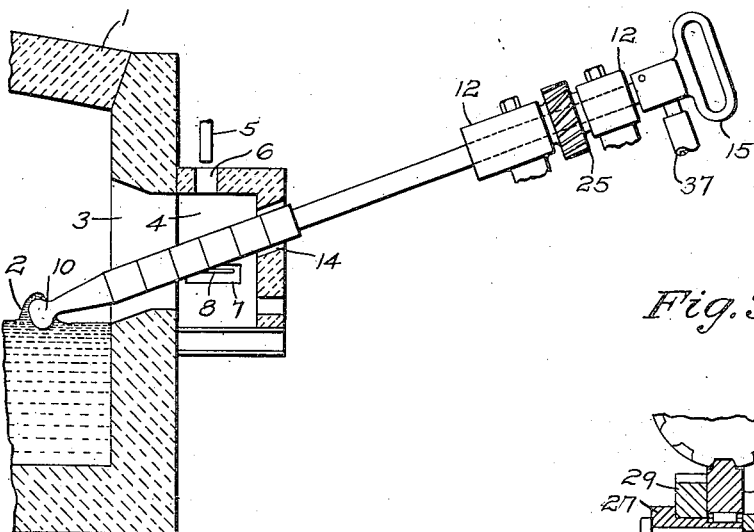
Figure 3:
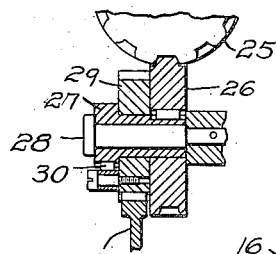
Figure 1:
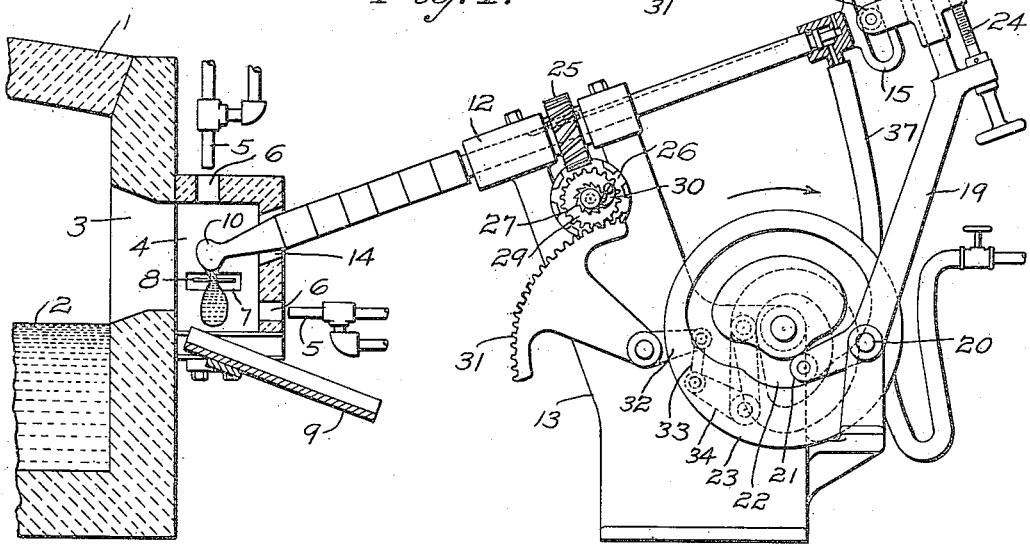

In the accompanying drawings which illustrate a form of mechanism conceived for carrying out the novel method, Figure 1 shows a sectional elevation of the walls of a furnace and heating chamber, and a side elevation of the actuating mechanism in the positions occupied when the gathering head is drawn out of the furnace into the heating chamber and a charge of glass is about to be cut off from the accumulated mass or gather and discharged. Fig. 2 shows a similar sectional elevation of the furnace and chamber with the head thrust in for gathering a mass of the glass. Fig. 3 shows on larger scale a transverse section on the plane indicated by the dotted line 3—3 on Fig. 1.

According to this method an unformed mass of glass is separated from a supply of glass, and is transferred to an auxiliary hot chamber, in which the separated mass is more or less reformed into a more definite drop or mold charge suitable for feeding to a mold, while protected by the chamber against undue chilling, and the mold charge is then discharged from the chamber into a mold or conveyer.

The furnace 1 indicated as containing molten glass 2 to the bottom level of the discharge opening 3 is of ordinary construction. About the discharge opening of the furnace a chamber 4 with refractory walls is placed. This chamber may be heated by the heat of the furnace, or it may be heated by gas jets blown from burners 5 through openings 6 in the walls of the chamber. Openings 7 are preferably made through the opposite side walls of the chamber for the entrance of shear blades 8 which operate at intervals to sever the gathered balls of glass so that they will drop either directly into the molds, or upon the discharge chute 9 at the bottom of the chamber and be conducted to the molds. The shear blades are operated by any suitable mechanism, and are drawn outside of the chamber and cooled by water sprays during the intervals between their cutting operations.

The gathering head 10 of refractory material is attached to a stem 11 that is free to rotate in and reciprocate through bearings 12 at the upper end of the frame 13. These bearings are arranged in such manner that the head projects obliquely downward through the opening 14 in the front wall of the heating chamber and can be thrust inwardly through the discharge opening 3 of the furnace into the liquid glass in the tank or melting pot. Mounted to swivel upon the outer end of the stem is a cross head 15, that is engaged by a roll 16 on a projection from the sleeve 17 which is fitted on a post 18. This post is mounted on the end of a lever 19 which is pivoted at 20 to a bracket or the frame 13, and which has a roll 21 working in the cam groove 22 in the disk 23. The sleeve 17 is adjustably held in exact position on the post by a feed screw 24 carried by the lever. By turning this screw the connection between the sleeve at the end of the lever and the link at the end of the stem may be adjusted so that the head will have a longer or shorter stroke into and out of the furnace, as for example to follow varying levels of the glass, but will draw back to the same outward discharging position, by virtue of the angular relations and the cross head 15. Splined on the gathering head stem between the bearings 12 is a gear 25. This connection permits the stem to reciprocate through the gear, and allows the gear to rotate the gathering head. In the mechanism shown this gear is engaged by a pinion 26, which is mounted on the hub of a ratchet wheel 27. The ratchet wheel hub turns on a stud 28 that is fastened to the frame, and turning on the ratchet hub is a gear 29. On the face of the gear 29 is a pawl 30 which is arranged to engage the teeth of the ratchet wheel, and meshing with this gear is a segmental rack 31. This rack is pivoted to the frame 13, and is oscillated by an arm 32 which is connected by a link 33 with the end of an angle lever 34 that has a roll 35 in the cam groove 36. In the mechanism shown the gear 25 and the pinion 26 are of the spiral type and the cam groove 22 is in one face and the cam groove 36 in the other face of the cam disk 23. The gathering head and its stem are hollow, so that the head may be prevented from overheating by currents of air blown into the stem from the tube 37, which is flexible and connected with a supply of air under pressure.

With this mechanism the head is thrust endwise obliquely down into the molten glass in the melting pot of the furnace, and when in the glass it is rotated to gather a mass. When a sufficient amount of glass has been collected the head is withdrawn to the heating chamber where its rotation is stopped so that the accumulated glass may sag or flow down and thus collect into a ball which can be readily severed by shears 8, to be allowed to separate by gravity alone. With this method uniform masses of glass are rapidly obtained from the furnace at regular stated periods and separated into independent gathers while maintaining the glass in the most desirable condition for subsequent operations. The dimensions of the gathering head should be proportioned to the size of the gathers to be made. Likewise the range and time of its movements should be adapted to the work done by suitably proportioning and timing the operating cams and their connections with the head.

The mechanism here shown may be driven in any convenient way, either directly from the glass shaping machine with which it is employed, or in synchronism therewith by any suitable connecting gearing.

I claim as my invention:—

1. The combination, with a container for molten glass, of a hot chamber, a gathering head, means for moving the gathering head into the container, mechanism for turning the head while in the container, and means for withdrawing the head from the container into the hot chamber.

2. The combination, with a container for molten glass, of a hot chamber, a gathering head, mechanism for moving the gathering head from the chamber into the container and back to the chamber, and mechanism for rotating the head in the container and stopping its rotation in the chamber.

3. The combination, with a glass furnace having a discharge opening, of a heating chamber surrounding said opening, a gathering head projecting into said chamber, mechanism for moving the gathering head from the chamber into the furnace and back to the chamber, and mechanism for turning the head while in the furnace.

4. The combination, with a glass furnace, of a chamber, means for heating said chamber, a gathering head, mechanism for reciprocating the gathering head from the chamber into and out of the furnace, and mechanism for turning the head while in the furnace.

5. The combination, with a glass furnace, of a heating chamber, a gathering head, mechanism for intermittently rotating the gathering head, mechanism for reciprocating the gathering head from the chamber into and out of the furnace, and means for severing the accumulations of glass depending from the gathering head in the chamber.

6. The combination, with a container for molten glass, of an auxiliary hot chamber, a gathering head, mechanism for reciprocating the head from the chamber into and out of the container, and means for varying the amplitude of the reciprocating movement at one end only.

7. The combination, with a glass furnace, of an auxiliary heating chamber, a gathering head, mechanism for reciprocating the head from the chamber into and out of the furnace, and means for varying the amplitude of the reciprocating movement at its inner end only.

8. The combination, with a glass furnace, of an auxiliary heating chamber, a gathering head, mechanism for reciprocating the head from the chamber into and out of the furnace, means for varying the amplitude of the reciprocating movement at its inner end only, and means for rotating the head at the said inner end of its movement.

9. A glass gathering apparatus consisting of a refractory gathering head, a stem attached to said head, a cam, lever and connection for reciprocating the stem and head, and a cam, lever, rack, and ratchet and pawl driven gears for intermittently rotating said stem and head.

10. The combination with a glass furnace, of a chamber extending from the furnace wall and having an opening at its lower end, a gathering head projecting into said chamber, and mechanism for moving the gathering head from the chamber into the furnace and back to the chamber.

11. The combination with a glass furnace having a protrusion in its side wall above the glass surface, of gathering means projecting through the protrusion into the furnace and adapted to separate a gather of molten glass from the glass in the furnace, and means for detaching a mold charge from the gather within the protrusion.

12. The combination with a glass furnace, of a discharge opening formed by a protrusion of the furnace side wall above the glass surface beyond the wall below that surface, gathering means adapted to separate a gather of molten glass from the glass in the furnace, and means for moving the gathering means to carry the freshly separated gather over the discharge opening.

13. The process of feeding glass, which consists in gathering the glass from a container, moving the gather into a hot chamber, and delivering the glass from the hot chamber.

14. The process of feeding glass, which consists in separating a gather from a supply of glass in a container, moving the separated gather into an auxiliary hot chamber, and discharging a mold charge from the gather in the chamber.

15. The process of feeding glass, which consists in separating an unformed mass of glass from a container, moving the mass to an auxiliary hot chamber, partly reforming the mass into a more definite gather in the hot chamber, and discharging the gather therefrom.

16. The process of feeding molten glass which consists in accumulating and separating a gather of the glass from a supply thereof, maintaining the gather in a heated environment, and separating a mold charge from the gather.

17. The method of feeding molten glass which consists in separating a gather of glass from a supply thereof, moving it to a discharge position in a heated chamber and there discharging a mold charge from the gather.

18. The method of gathering glass, which consists in removing a separated quantity of molten glass from a supply to a heated chamber, reforming the glass into a mass in said chamber, separating a mold charge from the reformed mass in the chamber, and discharging it therefrom.

19. The process of gathering glass, which consists in moving a gatherer into a supply of the glass, withdrawing the gatherer with an accumulation of glass to a heated chamber and discharging a mold charge from the accumulation on the gatherer in the heated chamber.

20. The process of gathering glass which consists in moving a gatherer into a supply of molten glass, accumulating a mass of glass on the gatherer, withdrawing the gather of glass to a hot chamber, and separating the accumulated glass in the chamber.

Signed at Hartford, Conn., this first day of December, 1916.

KARL E. PEILER.